United States Patent
Ma et al.

(10) Patent No.: US 7,432,893 B2
(45) Date of Patent: Oct. 7, 2008

(54) INPUT DEVICE BASED ON FRUSTRATED TOTAL INTERNAL REFLECTION

(75) Inventors: Hongshen Ma, Cambridge, MA (US); Joseph A. Pardiso, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 713 days.

(21) Appl. No.: 10/461,741

(22) Filed: Jun. 14, 2003

(65) Prior Publication Data

US 2004/0252091 A1  Dec. 16, 2004

(51) Int. Cl.
G09G 3/36 (2006.01)
(52) U.S. Cl. .............................. 345/87; 345/92; 345/104
(58) Field of Classification Search .................... 345/87, 345/156, 157, 163, 326, 173–176, 180, 419, 345/92, 104, 204; 715/768, 781; 250/221; 358/473; 359/443; 340/784, 365; 341/5; 349/12, 24
See application file for complete search history.

(56) References Cited

U.S. PATENT DOCUMENTS

| | | | | |
|---|---|---|---|---|
| 3,829,838 A * | 8/1974 | Lewis et al. ................. 345/419 |
| 4,254,333 A | 3/1981 | Bergstrom |
| 4,484,179 A | 11/1984 | Kasday |
| 4,542,375 A | 9/1985 | Alles et al. |
| 4,629,884 A | 12/1986 | Bergstrom |
| 4,782,328 A * | 11/1988 | Denlinger ..................... 341/5 |
| 4,814,600 A | 3/1989 | Bertgstrom |
| 5,105,186 A * | 4/1992 | May ............................ 345/175 |
| 5,444,677 A * | 8/1995 | Hosokawa et al. ....... 369/13.32 |
| 5,483,261 A * | 1/1996 | Yasutake .................... 345/173 |
| 5,982,352 A * | 11/1999 | Pryor ......................... 345/156 |
| 6,061,177 A * | 5/2000 | Fujimoto .................... 359/443 |
| 6,088,005 A * | 7/2000 | Walls et al. .................... 345/4 |
| 6,172,667 B1 | 1/2001 | Sayag |
| 6,229,529 B1 * | 5/2001 | Yano et al. ................. 345/175 |
| 6,232,957 B1 * | 5/2001 | Hinckley ................... 345/156 |
| 6,414,677 B1 * | 7/2002 | Robertson et al. .......... 345/419 |
| 6,414,728 B1 * | 7/2002 | Faris et al. ................... 349/10 |
| 6,879,318 B1 * | 4/2005 | Chan et al. ................. 345/173 |
| 7,009,663 B2 * | 3/2006 | Abileah et al. ............... 349/12 |
| 7,019,734 B2 * | 3/2006 | Cross et al. ................ 345/173 |
| 7,190,416 B2 * | 3/2007 | Paukshto et al. ............. 349/12 |
| 7,280,102 B2 * | 10/2007 | Abileah et al. ............. 345/204 |
| 2003/0179323 A1 * | 9/2003 | Abileah et al. ............... 349/24 |
| 2003/0197680 A1 * | 10/2003 | Davenport .................. 345/163 |
| 2003/0210537 A1 * | 11/2003 | Engelmann .................. 362/26 |
| 2004/0021912 A1 * | 2/2004 | Tecu et al. .................. 358/473 |
| 2004/0108990 A1 * | 6/2004 | Lieberman et al. ......... 345/156 |
| 2004/0113877 A1 * | 6/2004 | Abileah et al. ............... 345/92 |
| 2005/0206625 A1 * | 9/2005 | Mattice et al. ............. 345/173 |
| 2008/0111780 A1 * | 5/2008 | Abileah et al. ............... 345/87 |

* cited by examiner

*Primary Examiner*—Prabodh Dharia
(74) *Attorney, Agent, or Firm*—Charles G. Call

(57) ABSTRACT

A touch panel in which two or more light sensors emit light into a transparent panel at an angle to sustain transmission through the panel by total internal reflection. The transmitted light is detected at an array of light detection positions around the periphery of the panel opposite to each light source. When an object contact the surface of the panel, light transmitted along the pathway from a given source past the contact point to one of the detection points is attenuated by the frustrated total internal reflection (FTIR) effect. Each contact causes two or more intersecting light beams having known end points to be attenuated, enabling a connected processor to determine the position and size of the contact area.

20 Claims, 2 Drawing Sheets

INPUT DEVICE BASED ON FRUSTRATED TOTAL INTERNAL REFLECTION

FIELD OF THE INVENTION

This invention relates to methods and apparatus for detecting the position of objects and more particularly, although in its broader aspects not exclusively, to touch panels and touch screens which indicate the position, size and shape of a contact area on a work surface created by the presence of a stylus, brush, human finger or some other object.

BACKGROUND OF THE INVENTION

Touch screen systems that allow users to interact directly with content displayed on a 2D surface are becoming ubiquitous in many computing platforms. However, several limiting factors hinder the usability of these systems. First, few of these systems can preserve the familiar mechanical response of traditional tools such as brushes, pens, and bare fingers. Second, there are even fewer systems that can simultaneously detect multiple interaction points and are therefore unable to detect the size, shape, and other nuances of the drawing/writing tool. Third, most touch screen technologies don't scale gracefully to large surfaces, or involve significant expense or other practical limitations when extended to perimeters beyond a meter or so. Finally, most of these systems require severe modification of the drawing surfaces, or that bulky devices or materials be attached to the sensing side of the drawing surface, which means that the implementation of a large, comfortable drawing surface is simply not practical, robust, or cost-effective.

U.S. Pat. No. 4,254,33 issued to Arne Bergstrom on Mar. 3, 1981 describes the use of a touch key or panel constructed of an optically dense body, such as glass, which transmits light by "total internal reflection" from a light source, such as a light emitting diode (LED) to a light detector. When an object is brought into contact with the light-transmitting body, some of the transmitted light is refracted outward, resulting in detected attenuation of the light received by the detector. Bergstrom further suggests that this design principle can be used to a large touch keyboard in which the radiation field inside a large, plane-parallel glass plate forms a light-beam matrix, invisible from the outside, the rows and columns of the matrix being formed by a number of pairs of light source/detector pairs, with each source directing light towards an edge of the plate and transmitting light through the edges via multiple total internal reflection between the upper and lower surfaces of the plate to the corresponding detector on the opposite side of the plate. Touching the upper surface of the plate at the intersection between a row and column beam reduces the total internal reflection of these two intersecting beams, generating a key press identification.

Unfortunately, the touch keyboard proposed by Bergstrom can be implemented only with difficulty. A large number of light sources (one for each light detector) is required, and each light source must either emit light that is focused on a single detector, or each detector must be focused on a single source. This constraint makes the use of light source/detector pairs impractical for higher resolution devices which must necessarily use a large number of closely spaced detectors and sources.

There is accordingly a need for a practical, low-cost, high-resolution touch responsive system capable of determining of the position, size and/or shape of an area of contact on a large surface area.

SUMMARY OF THE INVENTION

The present invention takes the form of methods and apparatus for utilizing "frustrated total internal reflection" to detect the location, and potentially the size and shape, of an object brought into contact with the surface of the light carrying panel. In accordance with the invention, light emitted from each of at least two spaced-apart light sources is transmitted by total internal reflection through the panel to a plurality of spaced apart detection points on one or both of the surfaces of the panel.

Each light sources is optically coupled to the panel and transmits light into the panel al less than the critical angle so that the light propagates by total internal reflection to the spaced apart detection points which are positioned on the opposing periphery of a work surface. Each detection point may receive light from one or more of the sources, and the light detector generates an output indicating both the intensity level of the light and the particular source from which the measured light was received.

A signal processor converts signals which specify the end points of light beams that are attenuated by frustrated total internal reflection into an output indicating the position of an object brought into contact with the work surface. The processor may also indicate the size and/or shape of the contact area, and may further provide an indication of the pressure with which the object is pressed against the work surface.

The contacting object may be a human finger, a stylus, a brush, a felt pen, or other material capable of attenuating the transmitted light by frustrating the total internal reflection within the panel. Contacting objects which present different contact areas may detected to enable the touch surface to be used to produce different colors on a drawing, or act as an eraser to remove portions of the drawing at contact positions selected by the user. In addition, the application of pressure to the stylus or finger may be detected to vary the width of a drawn line, or to erase a selected part of the image which is "rubbed" by applying increased pressure.

The touch panel contemplated by the invention may use conventional glass or other light transparent material having a suitably high index of refraction to form the work surface. The light sources and detectors may be placed at the periphery of the light transmitting on either surface or at the panel edges. The panel is capable of detecting objects brought into contact with the panel at multiple positions simultaneously. Because the light sources and detectors can be placed on either surface, and accurate detection may be achieved on a large surface, the invention is particularly well suited for installation on an outdoor window, such as an interactive shop window.

These and other features and advantages of the invention may be more clearly understood by considering the following detailed description of the invention. In the course of this description, numerous references will be made to the attached drawings.

DETAILED DESCRIPTION

The proposed system detects the contact of a wet brush, felt pen, or finger to a surface using an optical technique called "frustrated total internal reflection" (FTIR).

Total internal reflection permits radiation to be transmitted substantially without loss between opposing surfaces of a transparent material. Total internal reflection is the reflection of electromagnetic radiation from the interface of a transparent material with larger index of refraction n1 (such as glass) with an adjoining medium having a smaller index of refraction n2 (such as air) when the radiation makes an angle smaller than the "critical angle" (sin −1 (n2/n1)) to the normal. When an object such as a human finger is placed in contact with the interface surface, "evanescent radiation" extending into a region occupied by contacting object permits energy to flow across the boundary. This phenomenon is known as frustrated total internal reflection. When transmission across the boundary occurs in this manner, the "total internal reflection" within no longer total, since some of the transmitted wave passes through the interface surface at the expense of the internally reflected light. See Bekefi, G. and Barrett, A. H. *Electromagnetic Vibrations, Waves, and Radiation*, Cambridge, Mass.: MIT Press (pp. 475-483) 1987.

As contemplated by the present invention, two or more light sources transmit light through the material at less than the critical angle from two or more different positions. The location of an object which comes into contact with a surface of the material is determined by detecting the attenuation of the light from each source at one or more of a plurality of spaced apart detection points at the surface or edge of the material. A data processor processing signals indicating the intensity of the light received at the detection points from each source to determine the location, size and/or shape of the contacting object.

The degree to which frustrated total internal reflection occurs also depends upon intimacy between the contacting object and the surface, the present invention may also be used to detect the amount of pressure which contacting object (e.g a human finger) engages the TIR surface. As the engaging object is pressed more closely against the TIR surface, the evanescent field that "leaks" through the surface is more completely absorbed, resulting in greater attenuation of the light transmitted by TIR to the light detector.

Figure 1:
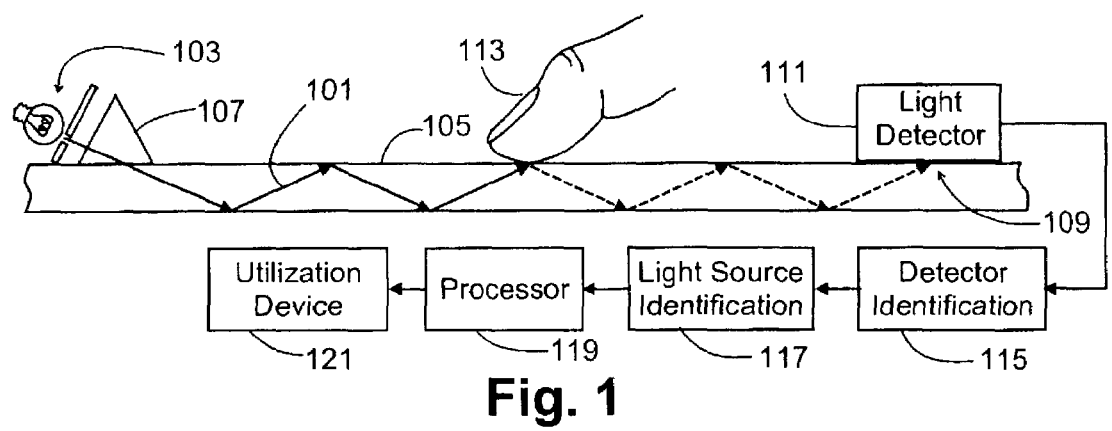
FIG. 1 is a block diagram illustrating the principals of operation of the invention.

FIG. 1 illustrates the basic technique used. A beam of light 101 from a near point source seen 103 is coupled into a pane of glass 105 by a prism 107 such that the light travels within the glass by way of total internal reflection (TIR). The light is detected at a detection point 109 by a light detector 111. When an object having object such as a human finger 113 is brought into contact with the surface of the glass pane 105, a portion of the light passing through the glass energy passes through the surface, resulting in a detectable decrease in the intensity of the light reaching the detector 111.

In order to detect the position, size and shape of the object brought into contact with the TIR panel, two or more light sources are used to direct light to a plurality of spaced apart detection points on the panel. Detected light signals are then processed to identify the end points of two or more light intersecting light beams whose intensity is attenuated by the presence of the contacting body. As illustrated in FIG. 1, the source from which each given light beam originates is identified at 115, and the point on the panel at which the beam is detected is determined at 117, thereby establishing the geometric end points of the beam. The processor seen at 119 determines the position and size of the contacting object by triangulation from the two or more intersecting beams.

Figure 2:
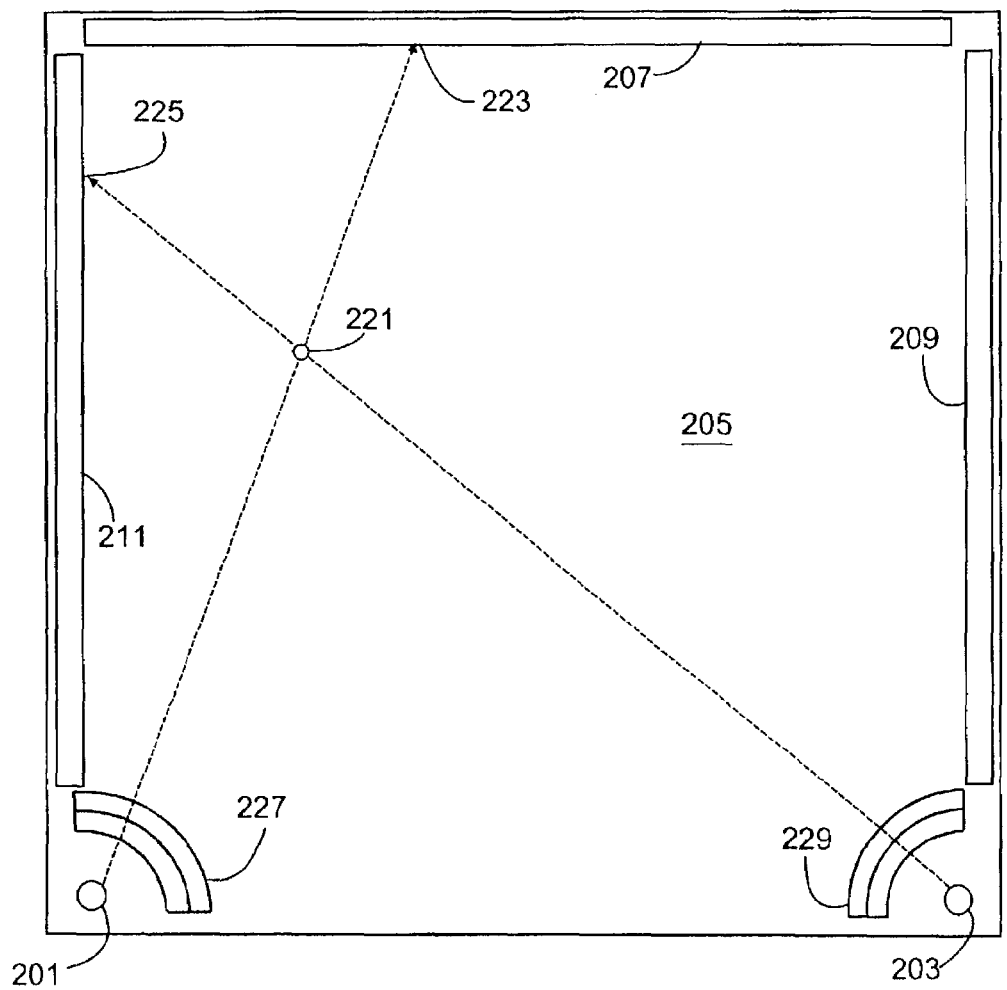
FIG. 2 is a plan view showing a touch panel embodying the invention which employs two light sources at the corners of the panel each of which transmits light by total internal reflection to light detection points on the opposing periphery of the panel.

A first embodiment of the invention is shown in FIG. 2. Two light sources 201 and 203 are positioned at the corners of a touch panel 205. Three arrays of light sensors 207, 209 and 211 are located at the perimeter of the panel 205. Light from the source 201 is directed toward two linear arrays of light detectors 207 and 209, and light from the source 203 is directed toward the panels 207 and 211. When an object is brought into contact with the panel 205 at the position 221, the light beam 223 passing from the source 201 to the detection point 225 is attenuated (frustrated). Similarly, the light beam 227 from source 203 to the detection point 229 is frustrated. With the end points of the beams 223 and 227 established, the connected processor can calculate the position 227 of the contacting object. Note that both the sources 201-203 and the detection arrays 207, 209 and 211 may be placed on the underside of the panel, thereby providing an unobstructed upper work surface. A non-translucent cover or coating on the outer surface of the panel 205 over the light detectors may be employed to help reduce the effects of ambient light on the detectors, so that only the internal transmitted TIR light is received.

Revolved prisms 227 and 229 are used to couple the incident light from the sources 201 and 203 respectively into the glass panel 205 and to evenly distribute it throughout the entire panel to the detector arrays on the opposing sides. The incident light is from each source 201 and 203 is distinctively modulated to identify the light from each source, and to distinguish the light from the ambient lighting from nearby incandescent or fluorescent lamps, or outdoor light. Note that the light detector array 207 receives light from both source 201 and 203; however, since the light from each source is distinctively modulated, the connected processor is able to determine the location both ends of each beam affected by the contacting object. By way of example, the light sources 201 and 203 may be turned ON and OFF in phase opposition, so that the source from which an attenuated beam was transmitted may be determined from the timing of the attenuated beam. Ambient light, however, would be present when either source is on, and may be eliminated by subtracting the DC component of the detected intensity. Numerous alternative modulation schemes may be used to both identify the source of each light beam, and to distinguish the FTIR light beams from ambient light. The location of the light source that is ON may also be determined from the detected light. For example, when the source 201 is ON, only the arrays 207 and 209 are illuminated, while the array 211 is not.

Figure 3:
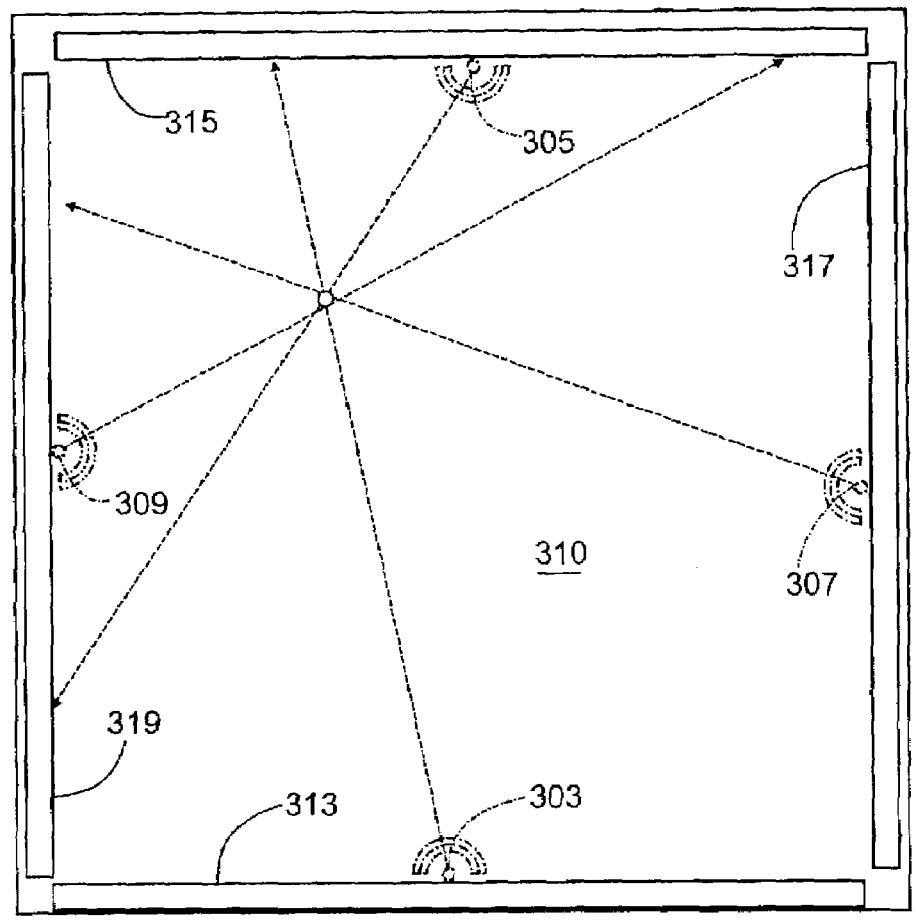
FIG. 3 is a plan view of a second touch panel embodying the invention using four light sources each positioned at the middle of one edge of the panel to transmit light to detection points on the other three edges of the panel.

As shown in FIG. 3, more than two sources of light may be used to provide better resolution. The touch panel of FIG. 3 employs four light sources 303, 305, 307 and 309. Each source is positioned at the midpoint of one of four edges of the rectangular touch panel 310. Each light source may be positioned at the inner edge of an adjacent array of light detectors, and directs light to the other three arrays on the other edges. For example, the light source 303 is positioned at the inner edge of the array 313 and directs light via a revolved prism 323 to the arrays 315, 317 and 319. The four light sources are placed on the lower surface of the panel 310, and the light detection arrays 313-319 are positioned on the upper side. In this way, ambient light from above the panel does not shine directly on the downwardly directed light detectors, and the light sources can be physically placed on the opposing surfaces such that light from the source does not shine on the array of detectors that is immediately above and slightly behind the source. As described above for the two-source embodiment shown in FIG. 2, the particular source from which a given detector is illuminated may be determined by uniquely modulating the light from each source, or by the timing of the received light when only one source is turned ON at a given time.

By using more than two light sources, any point of contact is specified by more than two intersecting attenuated beams. In the four source example of FIG. 3, a single point of contact results can yield six computed points of intersection. The computed output point may be an average of these points, and any computed point which is not near the computed average may be discarded as being attributable to a localized defect in the light transmission characteristics of the panel, or to a defect in a particular sensor. In this way, the panel may be automatically compensate for manufacturing defects or to localized damage to the device which occurs during use or handling.

Figure 4:
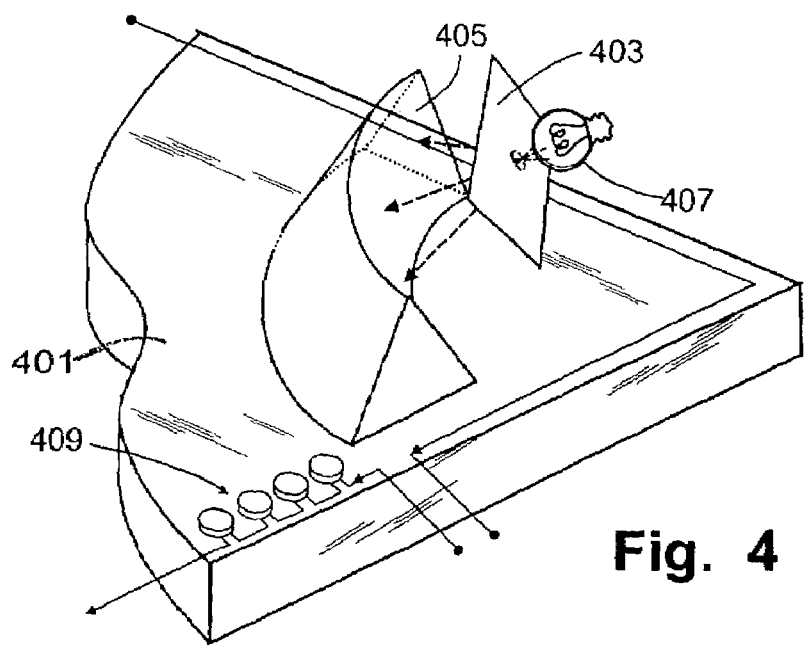
FIG. 4 is a perspective view illustrating the use of a revolved prism to transmit light at an angle into a light transmitting panel, and an array of light sensors for detecting light transmitted through the panel.

FIG. 4 illustrates the manner in which a point source of light is implemented by an aperture mask 403 through which light is transmitted from a source 407 to a revolved prism 405 which distributes light at an angle into the panel glass panel 401. A light emitting diode, a diode laser, or any suitable source may be used as a light emitter. The emitted light may have a characteristic frequency to distinguish it from ambient light, or may be switched or otherwise modulated to impart an identifiable characteristic which may be used to identify the source from which the light was emitted, or to permit the light sensor to better distinguish the TIR light transmitted within the panel from ambient light.

The detection of the light is preferably accomplished with a linear array of photodiodes as illustrated at 409 in FIG. 4 which are attached to the surface of the glass panel 401. Each detector is attached to the glass surface using an optical epoxy or the like, or by means of a microprism, in order to efficiently couple out the FTIR light. Note also that the detectors, as well as the light sources, can be attached to the edges of the glass panel which present optical surfaces substantially normal to the plane of the touch surface.

The individual detectors can be connected in series with one another, and all of the detectors around the periphery of the work service can be connected in a loop. Signal values representing the intensity of the received signal and identity of the individual detector are transmitted over a common bus to the remote processor (not shown) in response to the receipt of a "token" passed from each detector to its successor in the chain. There is only one token, and it moves around the ring in one direction. Each detector must wait for the token to arrive before sending its intensity and identification data. After the data is sent, the token is passed to the next detector in the chain. This method of communication, called "token passing," is commonly employed to exchange data between computers connected in a "Token-Ring Network."

When an object such as a wet brush, felt pen, or finger makes optical contact with the glass surface, TIR is frustrated and light is scattered out of the glass. The corresponding drop in intensity of light can be detected by photodetectors. Although continuous sensing of the illumination change could provide some degree of pressure measurement, for a simple touch screen application, the electronics can be simplified to produce a binary output.

The transparent touch panel may be positioned over an LCD or CRT display screen to provide a touch display of the type commonly used in kiosks, PDAs and laptop and tablet computers. The touch detection system of the invention can detect optical contact points with millimeter resolution on a meter-sized glass, such as an interactive store window. The resolution is only limited by the size of the illumination source and density of photodiode arrays. The use of two or more light sources also allows two independent points of contact to be located, even if they become aligned with one another.

When the device is used as a touch screen activated by finger touch, a passive coating, a deformable membrane, or a membrane spaced from the glass, may be used to cause light to leak from the TIR transmission. Such a coating reduces the problem that totaly dry fingers, or gloved fingers, do not make an good optical match with the glass surface. When a moistened stylus, such as a felt-tip pen moistened with a transparent fluid, is employed, no additional surface treatment is required.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. Apparatus for detecting the location of an object comprising, in combination,
   a transparent panel defining two opposing planar surfaces and having an index of refraction greater than air,
   a light detector optically coupled to said panel for detecting light transmitted within said transparent panel at a plurality of spaced apart detection points located at or near the periphery of said panel,
   a first light source optically coupled to said panel for transmitting light into said panel at an angle so that light from a first position propagates by internal reflection within said panel between said two opposing planar surfaces to a first set of said spaced apart detection points,
   a second light source optically coupled to said panel for transmitting light into said panel at an angle so that light from a second position propagates by internal reflection within said panel to a second set of said spaced apart detection points, and
   a data processor connected to said light detector for processing signals indicating changes in the light intensity at individual ones of said first and second sets of detection points to produce an output indication which specifies one or more locations on said surfaces where the presence of an adjacent object has caused a change in the internal reflection characteristics of said panel.

2. Apparatus for detecting the location of an object as set forth in claim 1 wherein said adjacent object is in physical contact with said panel at said one or more locations on said surfaces.

3. Apparatus for detecting the location of an object as set forth in claim 1 wherein both said first light source and said second light source are diode lasers.

4. Apparatus for detecting the location of an object as set forth in claim 1 wherein light from said first light source and from said second light source are both coupled to said panel by a prism having a light receiving surface and a light transmitting surface in contact with said panel.

5. Apparatus for detecting the location of an object as set forth in claim 1 wherein said light detector comprises a plurality of semiconductor light sensors each of which is optically coupled to said panel at one of said spaced apart detection points.

6. Apparatus for detecting the location of an object as set forth in claim 1 wherein said illumination source includes means for modulating the light from said first light source and from second light source with an identifying characteristic indicative of the source from which it is emitted, and wherein said light detector includes means responsive to the modulation of the received light at each of said detection points for determining the source from which said received light was emitted.

7. Apparatus for detecting the location of an object as set forth in claim 6 wherein said identifying characteristic is the timing of said modulation.

8. Apparatus for detecting the location of an object as set forth in claim 7 wherein said first light source and said second fight source are turned on and off at different times and wherein said light detector determines the source from which light is received at one of said detection points by the time when said light is received.

9. Apparatus for detecting the location of an object as set forth in claim 1 wherein said plurality of spaced-apart detection points are positioned around the periphery of said panel.

10. Apparatus for detecting the location of an object as set forth in claim 1 wherein optical sensors are positioned at each of said detection points.

11. Apparatus for detecting the location of an object as set forth in claim 10 wherein said optical sensors are connected in a ring configuration to supply data identifying each of said detectors and changes in the light intensity at said detection points.

12. Apparatus for detecting the location of an object as set forth in claim 1 wherein said transparent panel is positioned to overlay a display screen which displays computer generated content which is produced in part in response to said output indication form said data processor.

13. Apparatus for detecting the location of an object as set forth in claim 1 wherein said first light source and said second light source are light emitting diodes.

14. Apparatus for detecting the location of an object as set forth in claim 1 wherein said transparent panel is a store window.

15. A touch sensitive device for determining the relative location of a point of contact between an object and a surface comprising, in combination, a transparent panel defining said surface and an opposing surface, two or more light sources for transmitting light into said transparent panel at an angle to sustain transmission through said panel between said surface and said opposing surface by total internal reflection, sensing means for determining the intensity of light received at each of an array of light detection positions around the periphery of said panel, and means coupled to said sensing mean for identifying the attenuation of light transmitted along each one of plural intersecting light pathways, each of said pathways extending from an identified one of said light sources past said point of contact to an identified one of said light detection positions, processing means for processing data identifying said plural intersecting pathways for determining the location of said point of contact.

16. A touch sensitive device for determining the relative location of a point of contact between an object and a surface as set forth in claim 15 wherein each given one of said light sources emits light that is modulated to identify said given source.

17. A touch sensitive device for determining the relative location of a point of contact between an object and a surface as set forth in claim 15 wherein said transparent panel is substantially rectangular and wherein said light detection positions are located along the periphery of said panel opposite to said light sources.

18. A touch sensitive device for determining the relative location of a point of contact between an object and a surface as set forth in claim 15 wherein said light sources are diode lasers.

19. A touch sensitive device for determining the relative location of a point of contact between an object and a surface as set forth in claim 15 wherein said light sources are light emitting diodes.

20. A touch sensitive device for determining the relative location of a point of contact between an object and a surface as set forth in claim 15 wherein said light sources are turned on and off at different times and wherein said light detector determines the source from which light is received at one of said detection points by the time when said light is received.

* * * * *